Oct. 27, 1970 K. MALEK 3,537,070

APPARATUS FOR PATTERN RECOGNITION

Original Filed April 30, 1965 5 Sheets-Sheet 1

RIDGE DENSITY DETERMINING CKT

INVENTOR.
KASEM MALEK

BY Ronald J. Kransdorf

ATTORNEY

APPARATUS FOR PATTERN RECOGNITION

Original Filed April 30, 1965 5 Sheets-Sheet 2

United States Patent Office 3,537,070
Patented Oct. 27, 1970

3,537,070

APPARATUS FOR PATTERN RECOGNITION

Kasem Malek, Peekskill, N.Y., assignor to International Business Machines Corporation, Armonk, N.Y., a corporation of New York Continuation of application Ser. No. 452,284, Apr. 30, 1965. This application Mar. 4, 1969, Ser. No. 806,021
Int. Cl. G06k *9/12, 11/00*
U.S. Cl. 340—146.3 11 Claims

ABSTRACT OF THE DISCLOSURE

The invention provides a circuit for detecting various characteristics of a generally uniform line width pattern such as a fingerprint. The circuit can detect bifurcations in a fingerprint. A fingerprint is placed on a slowly rotating drum and scans of succeeding portions of the fingerprint are performed by a scanistor. If the spacing between two ridges of the fingerprint during a given scan is less than a predetermined value, an output is obtained from bifurcation-maybe circuit. If the width of a ridge is less than a predetermined threshold during a given scan, an output is obtained from a bifurcation-maybe circuit. The theory of operation is that if a narrow spacing, bifurcation-maybe condition is detected during a given scan, and a double width ridge is detected in a corresponding position during either the preceding or succeeding scan, a bifurcation has been detected, whereas if a narrow ridge is detected during a given scan and a double width spacing between ridges is detected during either the preceding or succeeding scan, a line ending has been detected. Therefore, assuming a scan from bottom to top, an AND gate is fully energized when a bifurcation-maybe indication is preceded by an indication of a double width ridge, thereby indicating a bifurcation pointing in the downward direction. Similarly, an AND gate is energized when a narrow width ridge is detected preceded by a detection of a double width space in-between ridges. This indicates a line ending pointing in the downward direction. Other AND gates similarly detect bifurcation and line endings pointing in the upward direction. An additional input is applied to AND gates to indicate that a scan is being conducted transverse to the ridge lines rather than parallel to them.

This is a continuation of application Ser. No. 452,284, filed Apr. 30, 1965, now abandoned.

This invention relates to a method and apparatus for pattern recognition and more particularly to a scheme for recognizing certain predetermined characteristics of such a pattern.

In order to automatically process data it is necessary that the data be presented in a format which can be recognized by the device being used. This may be accomplished either by manually preprocessing the data to place it in the proper format or by designing a device to automatically recognize the data and operate upon it to place it in the proper format. One form of data which it has been found to be particularly difficult to recognize and reformat has been fingerprints. The scheme of this invention is particularly applicable to the recognition of fingerprints.

There are at least two situations in which fingerprints must be recognized. The first is where it is desired to identify an unknown individual from one or more prints. This situation may arise for example when fingerprints are found at the scene of a crime. The second situation is where it is desired to verify the identity of an individual. This situation may arise when a person is seeking admittance to a maximum security area. In the foreseeable future, this situation may also arise in a retain sales environment, with a fingerprint being used in place of a credit card. At present, the print is analyzed manually in the first situation and assigned various classification characters. Prints having these same classification characters are then obtained from an indexed file and the identification verified either manually or semiautomatically using a comparison viewer, In the latter situation, a file of prints is maintained which is indexed by individuals' names. When a request for verification is received, the print corresponding to the indicated individual is retrieved, and the individual's identity is verified by either a manual or semiautomatic comparison much as in the first situation.

In both of the above-described situations the identification operation could be done more rapidly and accurately if the characteristics of the fingerprint could be automatically recognized. In the first situation, classification characters could automatically be assigned to the fingerprint in response to the recognized characteristics. By being able to accurately recognize all of the characteristics of an individual print, it may be possible, particularly in the latter situation described above, to make a positive identification of an individual with only a single print, rather than requiring the prints from several fingers as is now generally the case.

It is, therefore, a primary object of this invention to provide an improved automatic pattern recognition scheme.

A more specific object of this invention is to provide a scheme for automatically recognizing various characteristics of a fingerprint.

Another object of this invention is to provide a scheme of the type described above which is relatively fast, simple and accurate.

In accordance with these objects this invention provides a scanner which is adapted to scan succeeding portions of the pattern. During each scan of the pattern, the distance between adjacent segments of the pattern is monitored and an indication generated when this distance is either greater than normal by a predetermined factor or drops below a predetermined threshold. For a fingerprint, the segments would be the ridges of the print. A determination is similarly made as to the width of each segment and an indication generated when the width of a segment is greater than normal by a predetermined factor or when it drops below a predetermined threshold. The signals described above are applied to a circuit which analyzes signals from several succeeding scans and, as a result of this determination, recognizes various predetermined characteristics of the pattern.

The foregoing and other objects, features, and advantages of the invention will be apparent from the following more particular description of a preferred embodiment of the invention as illustrated in the accompanying drawings.

Figure 2:
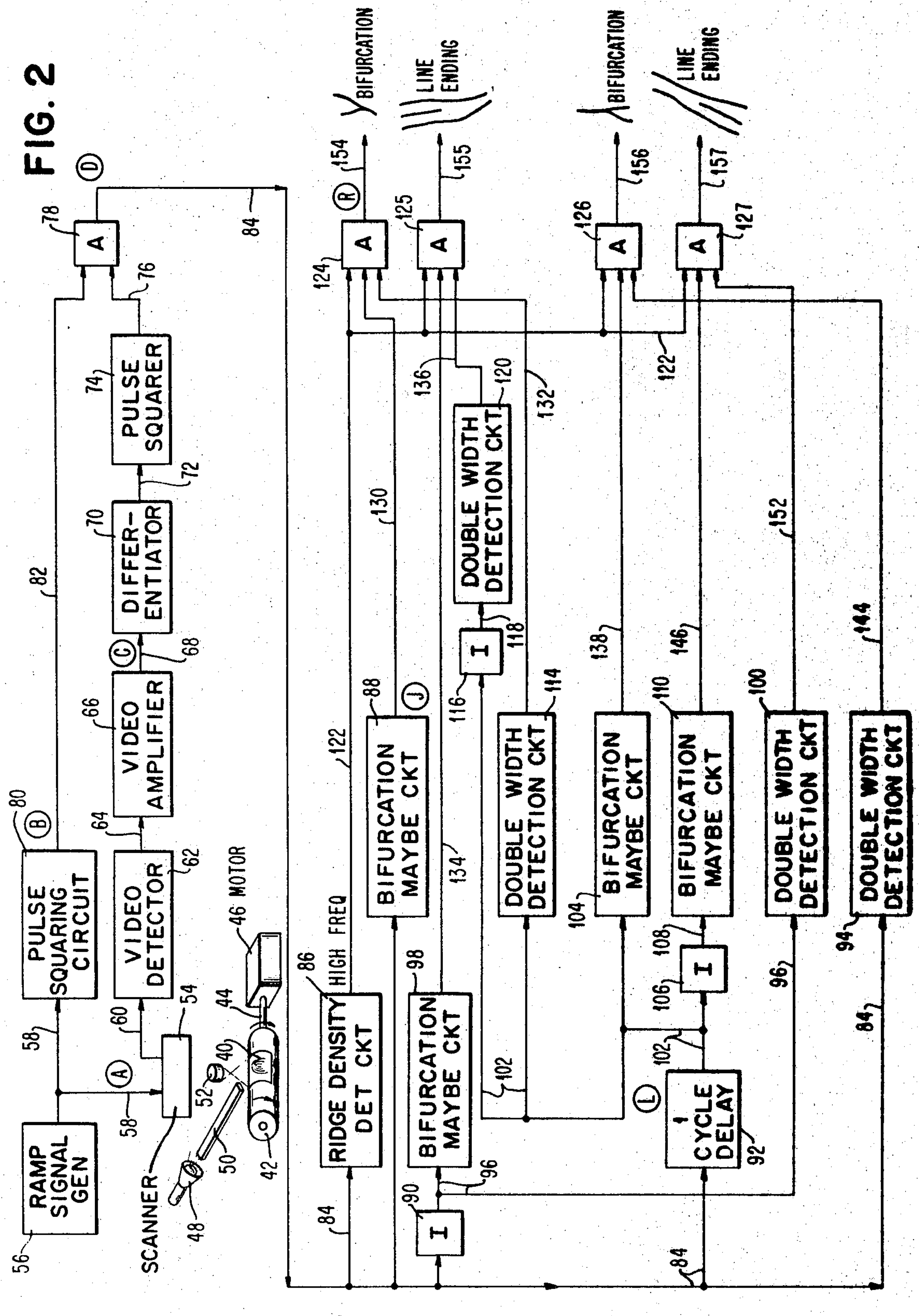
FIG. 2 is a semiblock diagram of a preferred embodiment of the invention.
Figure 4:
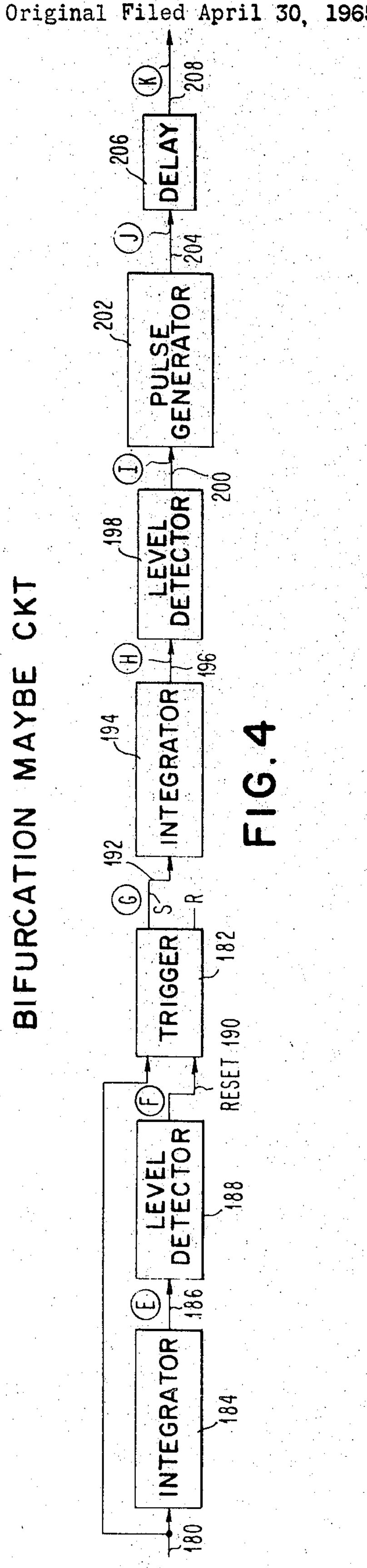
FIG. 4 is a block diagram of the bifurcation-maybe circuit shown in FIG. 2.
Figure 5:
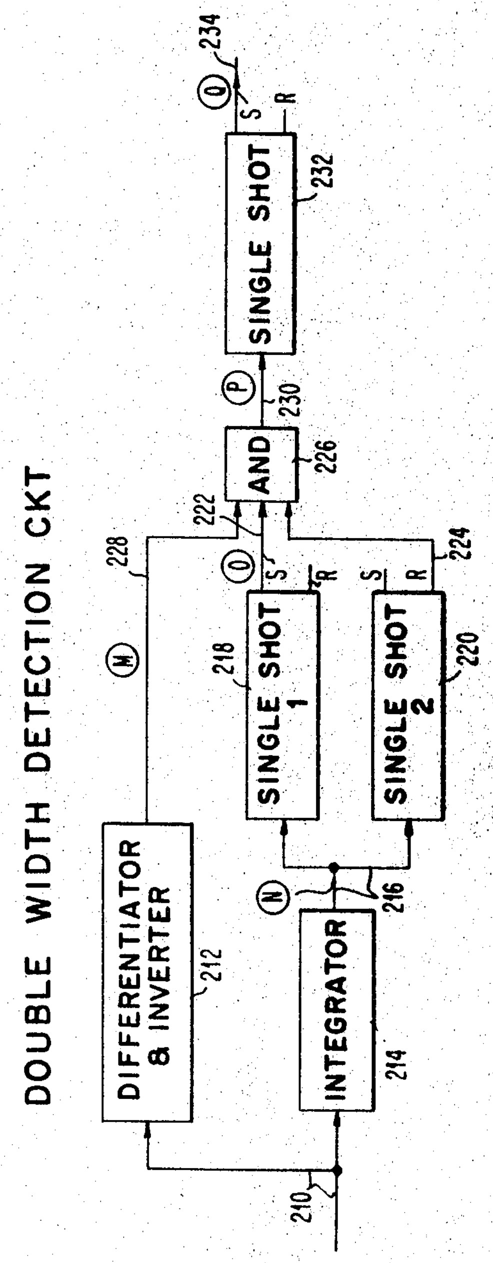
FIG. 5 is a block diagram of the double width detection circuit shown in FIG. 2.
Figures 6, 6A:
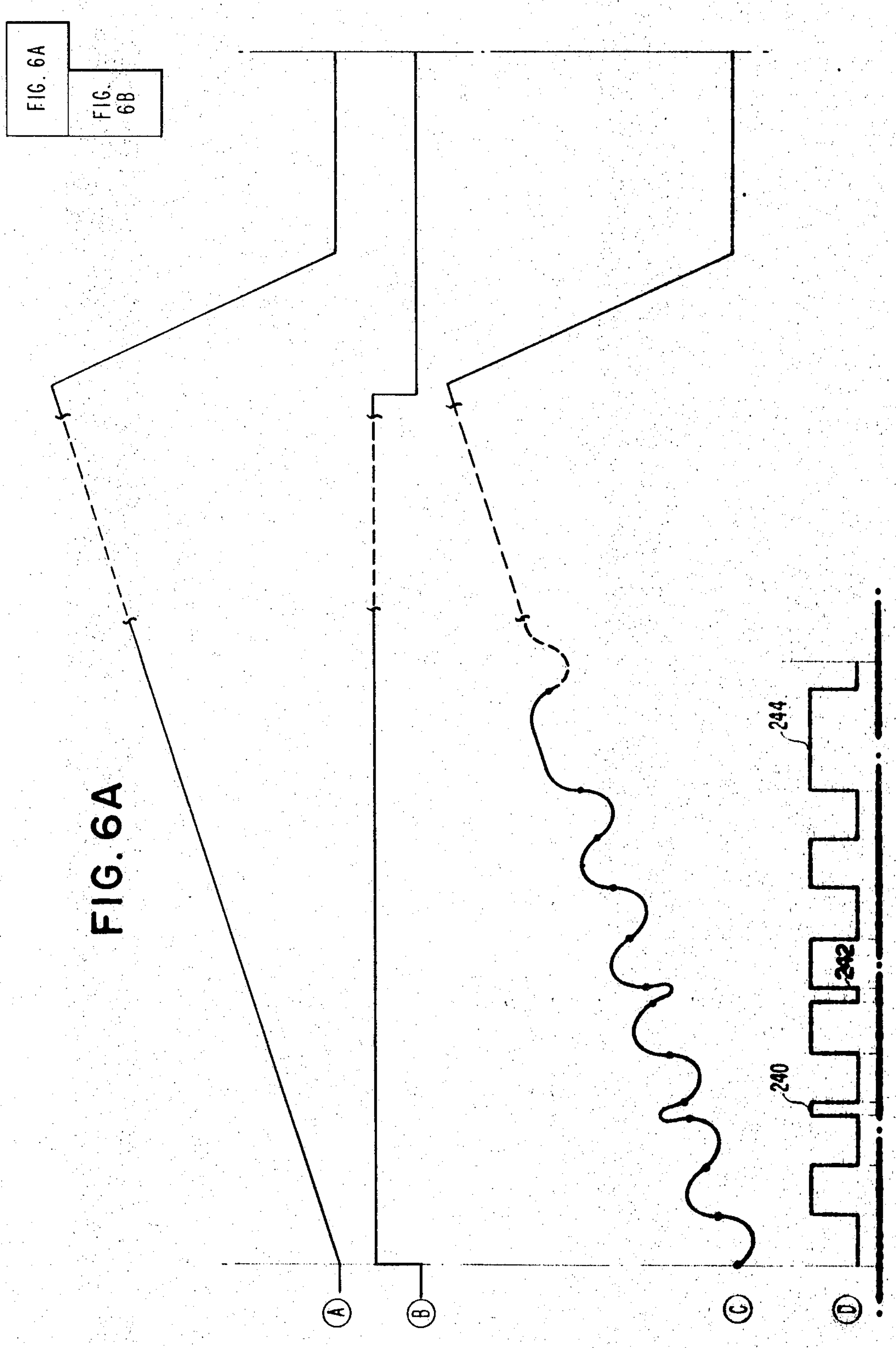
FIG. 6 is a diagram illustrating how FIGS. 6A and 6B should be combined to form a composite pulse diagram.
Figure 6B:
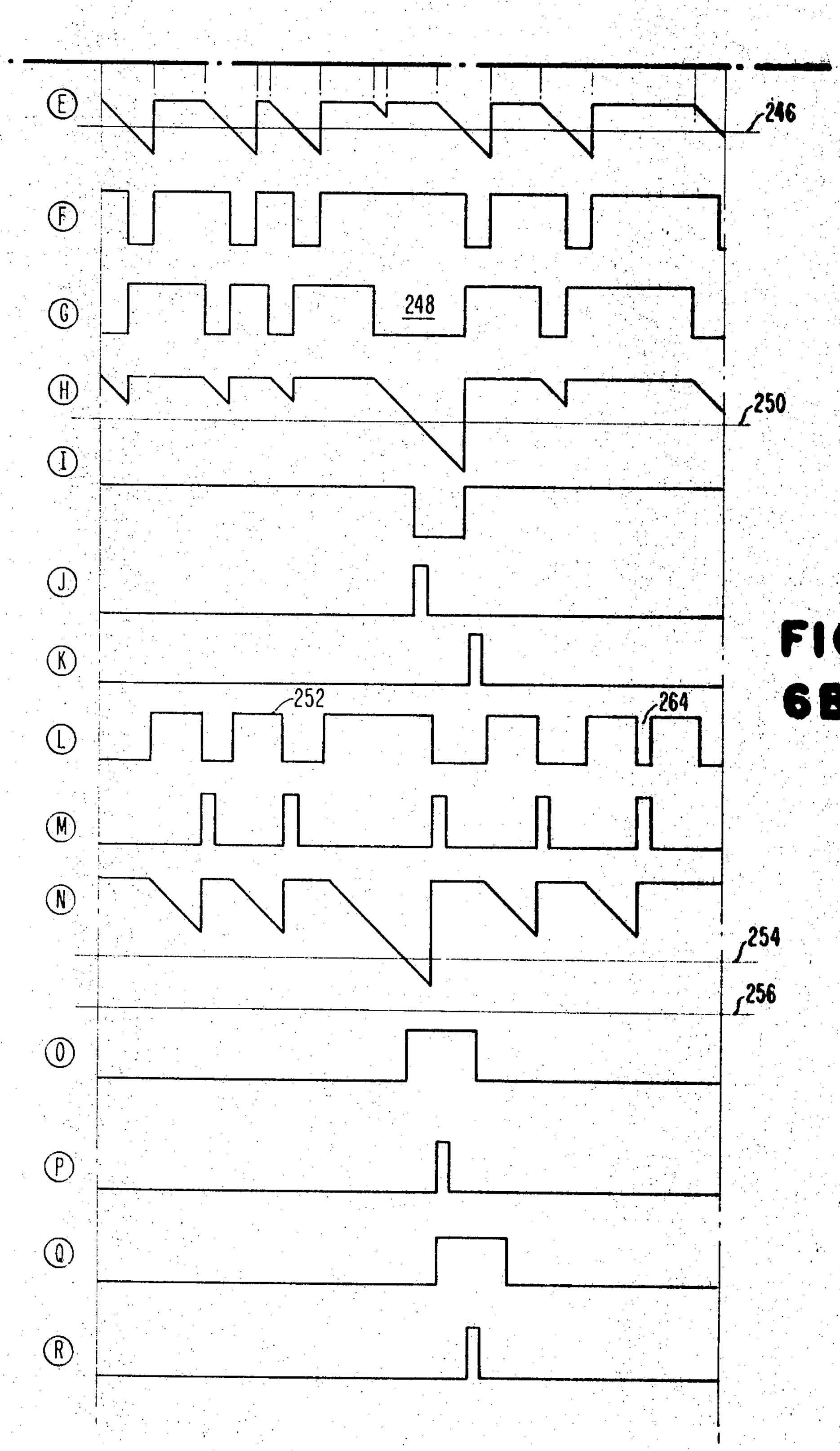

Line A–R of FIGS. 6A and 6B are pulse diagrams illustrating the waveforms appearing at the correspondingly marked places in the circuits of FIGS. 2, 4 and 5.

Figure 1:
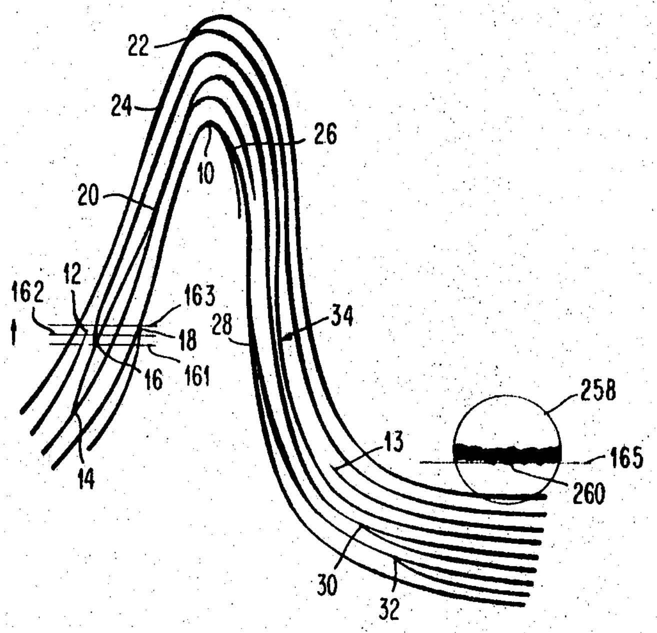
FIG. 1 is an enlarged view of a few representative ridges of a fingerprint.

Referring first to FIG. 1, it is seen that a normal fingerprint may be identified by use of several characteristics. One common manner of identifying fingerprints is to determine a center point such as point 10 and then to count the number of ridges (i.e. dark lines) and the relative direction of various other identifiable points from the center. Such other identifiable points may include line endings such point 12 or bifurcations such as points 14–32. While a human being has little difficulty in recognizing line endings and bifurcations and distinguishing them, from for example, a point like point 34 where two lines move together but do not merge, an automatic scanner has considerable difficulty in making these decisions.

One characteristic of a bifurcation is that as the two ridges start to merge, the distance between them gradually decreases and that just after the two ridges merge, the width of the resulting ridge is nearly twice that of each of the individual ridges which combined to form it. A bifurcation may therefore be recognized by finding a point in the fingerprint pattern at which the distance between ridges falls below a predetermined threshold while the ridges sandwiching the point each have a width approximately that of a normal ridge and a second point above or below this point at which there is a ridge of near double thickness. It may also be noted that a line ending such as point 12, exhibits the characteristics of a white bifurcation. Therefore, a line ending may be identified by using the same procedure as used for bifurcation, only looking at the white area, rather than the dark area. FIG. 2 shows a system for making the determinations described above.

CIRCUIT DESCRIPTION

Referring now to FIG. 2, it is seen that the record 40 carrying the fingerprint to be identified is mounted on a cylinder 42. Cylinder 42 is connected by a shaft 44 to motor 46 and is rotated in a clockwise direction thereby. The finger print is illuminated by light from a light source 48 transmited through light pipe 50. Light reflected from the record is picked up by lens system 52 and applied to a scanning device 54. For purposes of illustration, it will be assumed that the scanning device 54 is of the type known as a "scanistor" and shown in co-pending application Ser. No. 279,531 now U.S. Pat. No. 3,317,733 entitled "Radiation Scanner Employing Rectifying Devices and Photoconductors," filed May 10, 1963 on behalf of J. W. Horton and R. J. Lynch and assigned to the assignee of the instant application. The drive input to scanistor 54 is a ramp signal from ramp signal generator 56 which is applied to the scanistor through line 58. The ramp input to scanistor 54 causes succeeding segments of it to become responsive to the impinging light, the effect being much as if a window shade were slowly being raised across the face of the device. The resulting output, as shown in line C of FIG. 6A, is a ramp signal with a pulse variation superimposed on it corresponding to the variations in the light applied to the scanistor as the ramp sweeps across the image on record 40.

Output line 60 from scanistor 54 is connected through video detector 62, line 64, video amplifier 66, and line 68 to the input of differentiator 70. Output line 72 from differentiator 70 is connected through pulse squarer 74 and line 76 to one input of AND gate 78. Beforementioned output line 58 from signal generator 56 is connected through pulse squaring circuit 80 and line 82 to the other input of AND gate 78.

Figure 3:
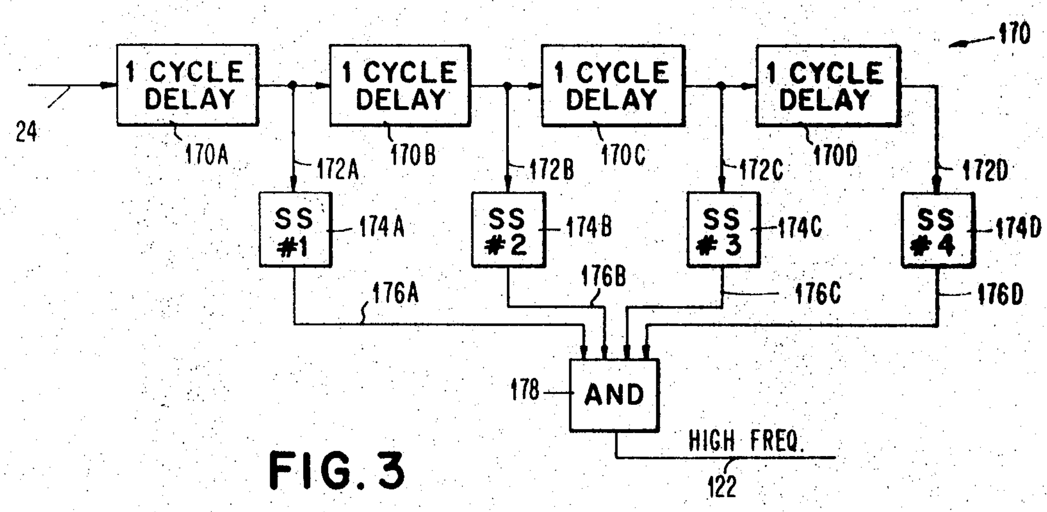
FIG. 3 is a block diagram of the line frequency determining circuit shown in FIG. 2.

Output line 84 from AND gate 78 is connected as the input to ridge density determining circuit 86, bifurcation-maybe circuit 88, inverter 90, one cycle delay 92, and double width detection circuit 94. A circuit suitable for use as the line frequency determining circuit 86 is shown in FIG. 3; a circuit suitable for use as the bifurcation-maybe circuit 88 and as the other bifurcation-maybe circuits of FIG. 2 is shown in FIG. 4; and a circuit suitable for use as a double width detection circuit 94 and as the other double width detection circuits of FIG. 2 is shown in FIG. 5. These circuits will be described in more detail later. Output line 96 from inverter 90 is connected as the input to bifurcation-maybe circuit 98 and as the input to double width detection circuit 100. Output line 102 from delay 92 is connected as the input to bifurcation-maybe circuit 104 inverter 106, double width detection circuit 114 and inverter 116. Output line 108 from inverter 106 is connected as the input to bifurcation-maybe circuit 110. Output line 118 from inverter 116 is connected as the input to double width detection 120. For reasons which will be apparent later, the combination of inverter 90 and bifurcation-maybe circuit 98, and the combination of inverter 106 and bifuration-maybe circuit 110 may be though of as line-ending maybe circuits.

High-frequency output line 122 from ridge density determining circuit 86 is connected as one input to AND gates 124–127. Output line 130 from bifurcation-maybe circuit 88 is connected as a second input to AND gate 124. The third input to this AND gate is output line 132 from double width detection circuit 114. Output line 134 from bifurcation-maybe circuit 98 is connected as a second input to AND gate 125. The final input to this AND gate is output line 136 from double-width-detection circuit 120. Output line 138 from bifurcation-maybe circuit 104 is connected as a second input to AND gate 126. The third input to this AND gate is output line 144 from double width detection circuit 94. Output line 146 from bifurcation-maybe circuit 110 is connected as the second input to AND gate 127. The final input to this AND gate is output line 152 from double width detection circuit 100.

A signal on output line 154 from AND gate 124 indicates that a bifurcation such as bifurcation 14 in FIG. 1 has been detected. An output signal on line 155 from AND gate 125 indicates that a line ending facing in the opposite direction from the line ending 12 shown in FIG. 1 has been detected. A signal on output line 156 from AND gate 126 indicates that a bifurcation such as bifurcation 18 in FIG. 1 has been detected and an output signal on line 157 from AND gate 127 indicates that a line ending such as line ending 12 in FIG. 1, has been detected.

RIDGE DENSITY DETERMINING CIRCUIT

Before referring to FIG. 2, the function of the ridge density determining circuit will be briefly described. It is seen in FIG. 1 that some of the scan lines such as the lines 161–163 are drawn nearly perpendicular to the fingerprint ridge in the area shown, whereas scan line 165 moves in the area shown nearly parallel to the ridge. For reasons which will be apparent later, it is desirable to note whether a scan is being performed nearly parallel or nearly perpendicular to the ridges in the area being looked at. One factor which distinguishes the scans in these two areas is that a larger number of ridges per unit time are scanned when in a perpendicular region such as that scanned by the lines 161–163 than when in a parallel region such as that scanned by line 165. A rough measure of the orientation of the scane direction relative to the ridges in an area may therefore be obtained by assigning a value of one to the number of ridges per unit time which are scanned when moving perpendicular to the ridges and noting how close to this figure the ridge count is, in the area scanned. A high frequency area may be defined as, for example, one in which the ridge count is 0.5 or a greater fraction of the ridge count when moving in a perpendicular region.

Referring now to FIG. 3 it is seen that line 84 is connected as the input to four-cycle delay 170. Delay 170 is divided into four one cycle segments 170A–170D. The output of delay 92 (FIG. 2) may be substituted for the output of delay 170A. Output lines 172A–172D from segments 170A–170D, respectively, are connected as the inputs to single-shot circuits 174A–174D. The time duration of the single shots 174 is set so that they remain in their energized state if inputs are applied to them at a rate equal to or greater than that desired as a criterion for a high frequency region. Output lines 176A–176D from single shots 174A–174D, respectively are connected as the inputs to AND gate 178. The output from AND gate 178 is high frequency line 122. It may, in some instances, be sufficient to monitor less than four cycles to determine regional ridge-count distribution. The reason for more than one cycle monitoring is to assure that deteriorations (for example in region 260) in some ridge edges which may appear at the output of any of the single shots 174A–174D, when scanning parallel to ridge patterns, will not get through AND 178 on line 122.

BIFURCATION-MAYBE CIRCUIT

Referring to FIG. 4, it is seen that the input line 180 to a bifurcation-maybe circuit is connected as the input to the set side of trigger 182 and as the input to integrator 184. Output line 186 from integrator 184 is connected as the input to level detector or threshold circuit 188. Output line 190 from circuit 188 is connected as the reset input to trigger 182. Output line 192 from the set side of trigger 182 is connected as the input to integrator 194. Output line 196 from integrator 194 is connected as the input to level detector or threshold circuit 198. Output line 200 from circuit 198 is connected as the input to pulse generator 202. Output line 204 from pulse generator 202 is connected through short delay 206 to circuit output line 208. A bifurcation-maybe signal appears on output line 208 when the circuit shown in FIG. 4 is suitably energized.

DOUBLE WIDTH DETECTION CIRCUIT

Referring now to FIG. 5, it is seen that input line 210 to a double width detection circuit is connected as the input to differentiator and inverter 212 and integrator 214. Output line 216 from integrator 214 is connected as the set input to single shots 218 and 220. The single shots are adjusted such that single shot 218 fires when a pulse applied to line 210 has lasted for a time period equal to the lower limit of a double width pulse and single shot 220 fires when the pulse has lasted for a duration equal to the upper limit of a double width pulse. Output line 222 from the set side of single shot 218 and output line 224 from the reset side of single shot 220 are connected as two of the inputs to AND gate 226. The third input to this AND gate is output line 228 from differentiator 212. Output line 230 from AND gate 226 is connected as the input to single shot 232. The duration of single shot 232 is equal to the time period of a double width pulse during which a bifurcation-maybe pulse may occur. The significance of this fact will be apparent later. Output line 234 from the set side of single shot 232 is the output line from the double width detection circuit.

OPERATION

In operation, a determination is initially made, either manually or by some undisclosed mechanical device, as to the location of centerpoint 10 (FIG. 1). An orientation determination is similarly made. Selection of both centerpoint and orientation, however, is arbitrary as long as they are repeatably detectable. The record 40 (FIG. 2) containing the print is then placed on drum 42 with the centerpoint 10 and orientation line being used to properly position the print. Motor 46 is then started, light source 48 ignited, and ramp signal generator 56 energized. The sweep of scanistor 54 is sufficiently fast relative to the movement of motor 46 that each scan of the print covers a straight line portion thereof. Lines 161–163 (FIG. 1) represent portions of three such scans. The time duration between two cycles from ramp generator 56 is sufficient to permit the motor to increment the fingerprint to a new position so that the next scan is on an adjacent portion of the print. For purposes of illustration, the scan has been shown as progressing from the bottom to the top of the print. However, a scan may proceed in either direction, and, as will be seen later, several scans in different directions may be performed.

Referring to FIG. 1, assume that a scan has just been completed along line 161 and that a scan is now being performed along line 162. The output signals at various points in the circuits of FIGS. 2–5 during the portion of this scan when the left half of each of the ridges is being scanned are shown in FIGS. 6A and 6B. The ramp output from ramp signal generator 56 is applied to energize scanistor 54 and is also applied to pulse squaring circuit 80. The square wave output from circuit 80 is shown on line B of FIG. 6A. This signal is used to gate the output from the scanistor into the analyzing portion of the circuit. The effect of the gate signal on line 82 is to prevent noise pulses from being applied to the analyzing portion of the circuit. The output from scanistor 54 is applied through video detector 62 and video amplifier 66 to obtain a waveform such as that shown on line C of FIG. 6A. This waveform is positive in areas corresponding to the ridges (dark lines) in FIG. 1 and negative in areas corresponding to the spaces between ridges. This signal is passed through differentiator 70 to eliminate the ramp signal component and through pulse squarer 74 to obtain a square wave form. The results of this operation are then gated through AND gate 78 on to line 84. The signal on line 84 for the portion of the scan described above is shown on line D of FIG. 6A.

Referring now to FIG. 1 and line D of FIG. 6A simultaneously, it is seen that as the scan represented by line 162 reaches the leftmost of the fingerprint ridges a positive pulse appears on line 84 (FIG. 2). This is followed by a negative pulse as the scan proceeds into the space to the left of this ridge and then by a narrow positive pulse 240 corresponding to the narrow portion of line ending 12. As the scan proceeds, a normal negative pulse appears on line 84 corresponding to the space to the right of line ending 12. Following this is a normal positive pulse, a narrow negative pulse, and a normal positive pulse corresponding to the bifurcation 16. The narrow negative pulse 242 results from the fact that the space between the two lines on either side of it has been reduced below a predetermined threshold. The remaining pulses shown on line D of FIG. 6A are a normal negative, a normal positive, a normal negative and a double-length positive pulse, the double length positive pulse corresponding to the upper end of bifurcation 18.

The pulses appearing on line 84 are applied to one input of bifurcation-maybe circuit 88. Referring now to FIG. 4, it is seen that each negative pulse appearing at the input to this circuit is applied to set trigger 182 and is also applied to integrator 184. The output from integrator 184 is shown on line E of FIG. 6B. When the negative going output from integrator 184 exceeds a negative value represented by the line 246 on line E of FIG. 6B, level detector 188 generates a negative output signal on line 190. (See line F of FIG. 6B.) This negative signal is applied to reset trigger 182. Since the integrated output (shown on line E of FIG. 6B) of the narrow pulse 242 (on line D of FIG. 6A) does not reach threshold line 246, this pulse causes no output from level detector 188. This means that there is a negative output on set line 192 from trigger 182 for a longer period of time when an inter-ridge space of width less than the indicated threshold is scanned, than would ordinarily be the case. This extra-wide negative output from trigger 182 is shown as pulse 248 on line G of FIG. 6B. The signal on line 192 is applied to integrator 194 resulting in an output waveform of the type shown on line H of FIG. 6B. The output from integrator 194 is applied to level detector 198. Level detector 198 generates an output only when the output from integrator 194 exceeds a negative value represented by the line 250 on line H in FIG. 6B. Therefore, only the integrated output as a result of pulse 248 being applied to the integrator causes an output from level detector 198 on line 200. This pulse is shown on line I of FIG. 6B.

The pulse on line 200 is applied to pulse generator 202 to cause a narrow-width positive pulse output on line 204. From the above, it can be seen that the significance of the narrow-width positive output on line 204 is that it indicates that a space between two ridges less than the indicated threshold has just been scanned. The pulse on line 204 is delayed slightly in delay 206, for reasons which will be apparent later, and applied to circuit output line 208. For bifurcation-maybe circuit 88, line 208 corresponds to line 130.

During the scan cycle prior to that described above, a scan of the portion of the print indicated by line 161 (FIG. 1) was performed. The results of this scan as they appeared on line 84 (FIG. 2) were applied to one cycle delay 92 (FIG. 2). Therefore, at exactly the same time that pulses are appearing on lines 84, pulses corresponding to the same ridges during scan are appearing on output line 102 from delay 92. These delayed pulses are shown on line L of FIG. 6B.

The signal on line 102 is applied to the input of double-width detection circuit 114. Referring now to FIG. 5, it is seen that the input to double-width detection circuit 114 is applied to a differentiator and inverter 212 and an integrator 214. The output from differentiator 212, shown on line M, FIG. 6B, is a series of positive pulses corresponding to the points where each of the applied input pulses drops from a positive to a negative level. The negative pulses which would ordinarily occur on line 228 at the leading edge of each pulse on line 210 are blocked by the inverter in circuit 212. The output from integrator 214 is shown on line N of FIG. 6B. It is desired that single shot 218 fire when the output from this integrator exceeds a value represented by line 254 and that single shot 220 fire when the output from integrator 214 exceeds a value represented by line 256. An input pulse with a width such that the output from integrator 214 causes single shot 218 to fire but does not cause single shot 220 to fire is considered to be a double-width pulse. Therefore, AND gate 226 generates an output signal only when, at the end of the pulse applied to line 210 (this fact being indicated by the output from differentiator 212) single shot 218 is set and single shot 220 is reset. The short pulse out of AND gate 226, shown on line P of FIG. 6B is applied to set single shot 232.

From the above discussion, it can be seen that the bifurcation-maybe signal on line 130 FIG. 2 (the pulse shown on line K of FIG. 6B) and the double-width detection output pulse on line 132 from double width detection circuit 114 (the pulse shown on line O of FIG. 6B) result from the scanning of bifurcation 16 (FIG. 1) during the scans represented by lines 162 and 161 respectively. For obvious, it has been determined that a bifurcation is recognized only if a bifurcation-maybe pulse is generated during a given scan, a double-width pulse is detected during either the preceding or the following scan, the bifurcation-maybe pulse occurs near the center of the double-width pulse, and all this occurs in a high ridge density region. Since, from the nature of the double-width detection circuit an output from it can not be derived until the end of the double-width pulse, it is necessary to either delay the bifurcation-maybe signal or advance the double-width detection signal to resynchronize them. In the example being described, the former approach has been taken as indicated by delay 206 in FIG. 4 and line K of FIG. 6B. The problem of determining whether the bifurcation-maybe pulse occurs near the center of the double width pulse is solved by setting the duration of single shot 232 (FIG. 5) equal to the width of the portion of the double width pulse during which a bifurcation-maybe pulse may occur and still be considered near the center, and by setting the duration of delay 206 (FIG. 4) such that its output would occur at the center of the output from single-shot 232 for a normal bifurcation. Therefore, if pulses appear simultaneously on lines 130 and 132 and there is also a signal on line 122, this means that for a high frequency region, a double width pulse has been detected during a scan and a bifurcation-maybe pulse has occured during the next scan at the position corresponding to the center of the double width pulse. This is interpreted to mean that a bifurcation pointed in an upward direction has been detected.

To illustrate the need for the signal on line 122, refer to scan line 165 in FIG. 1. Due to the uneven texture of the ridges which may be seen in the enlarged view of a portion of the outermost ridge shown in circle 258, it is possible, when scanning parallel to the ridges, to obtain a bifurcation-maybe signal at the point 260. While it is unlikely that this would be preceded by a double-width pulse, it is possible and, to eliminate this possibility, a bifurcation is recognized only when a scan is being performed either perpendicular or near-perpendicular to the ridges. As indicated previously, the single shots in FIG. 3 remain set only if inputs are applied to them at a frequency in excess of a predetermined value which, for example, corresponds to one-half the frequency at which ridges would be scanned, if proceeding in a direction perpendicular to the ridges. Therefore, if all inputs to AND gate 124 are present, an output signal on line 154 occurs, indicating that a bifurcation facing in the upward direction has been detected. Since the fingerprint has been positioned in a known manner on drum 42, the time at which the signal on line 154 occurs gives an indication of its relative position on the print. This information may be recorded in printed form or applied to the memory of a computing device for further processing.

Referring again to line D of FIG. 6A, it is seen that there is a double-width pulse 244 detected during this scan. This pulse is recognized by double-width detection circuit 94 causing an output signal on line 144 which is applied as one input to AND gate 126. Referring now to line L of FIG. 6B which is the one-cycle-delayed output corresponding to scan line 161 (FIG. 1), it is seen that there is a narrow negative pulse at point 264 which is applied through line 102 and recognized by bifurcation-maybe circuit 104. The resulting output signal on line 138 has been delayed sufficiently in delay 206 (FIG. 4) so as to be applied to AND gate 126 simultaneously with signal on line 144. Assuming that there is an output on high frequency line 122 from frequency detecting circuit 86 at this time, which there should be considering the direction of scan, this causes AND gate 126 to generate an output signal on line 156. Bifurcation 18, a bifurcation pointing in the downward direction, is in this manner recognized.

Because of the inherent properties of line endings and bifurcations, it is apparent that one will change to the other if a negative of the print is obtained. In the electric current sense this is equivalent to inverting the signals as is done by Inverters 90 and 106 (FIG. 2). Hence, a positive narrow pulse and a negative double-width pulse associated with a line ending are inverted allowing identical circuits to be used for line ending detection. Referring again to line D of FIG. 6A and remembering that these pulses represent the outputs obtained during scan 162 (FIG. 1), it is seen that there is a narrow positive pulse 240 corresponding to the line ending 12. This pulse is applied to one-cycle delay 92. One cycle later, this pulse is applied through inverter 106 and line 108 to the bifurcation-maybe circuit 110 causing an output signal on line 146 which is applied to AND gate 127. At the same time that this is being done, the scan represented by line 163 on FIG. 1 is detecting a double-width negative pulse which is applied through inverter 90 and line 96 to double-width detection circuit 100. The resulting output signal on line 152 is applied to a second input of AND gate 127. The delay 206 in bifurcation-maybe circuit 110 assures that the inputs to AND gate 127 occur in synchronism. The resulting output signal on line 157 is interpreted as indicating that a line ending pointing in the the upward direction has been detected. A line ending pointing in the downward direction is similarly detected by AND gate 125 and output line 155. It should, at this point, be noted that each bifurcation-maybe indication need not be either preceded or succeeded by a double width pulse and, in fact, several bifurcation-maybe conditions will generally be detected before or after the actual detection of each bifurcation. In addition, several bifurcation-maybe pulses will be generated during the scan of area 34 without a bifurcation being detected.

While the circuit described to this point is capable of detecting line ending 12 and bifurcations 14, 16, 18, 20, 26 and 28, it is not capable of recognizing bifurcations 22, 24, 30 and 32 which are oriented parallel to the direction of scan. It is therefore apparent that in order to catch all bifurcations and line endings at least two scans in more or less orthogonal directions to each other are required. The second scan could be accomplished either by manually rotating the record 40 on drum 42, by manually, mechanically or electrically reorienting the direction of scan of scanistor 54, or by providing an additional scanistor 54 which is oriented in a different direction to that shown, and providing gating circuitry to connect wave generator 56 and video detector 60 to the proper scanistor for a given scan. A third scan in still a new direction may be desirable in order to catch all the possible characteristics of the fingerprint being studied.

While the system described so far is capable of recognizing only bifurcations and line endings, it is apparent that the circuit could be modified to recognize islands such as that appearing between bifurcations 14 and 20, or short ridges which are made up of two oppositely-facing line endings. This would be helpful in distinguishing the situation represented by bifurcations 14 and 20 from that represented by bifurcations 16 and 20. The detection of an island or a short ridge would involve the storing of a predetermined number of scans after a bifurcation pointing in the direction of scan or a line ending pointing in the opposite direction from the scan are detected in order to see if an oppositely-facing bifurcation or line ending occurs further along without a ridge or space projecting between them.

The above discussion has been with respect to fingerprints since this is the form of pattern in which characteristics such as bifurcations and line endings are most likely to occur. However, it is apparent that the scheme of this invention could be employed to recognize similar characteristics in any form of pattern.

It should also be noted that the circuits and elements shown in FIGS. 2–5 are merely illustrative and that any circuits or elements capable of performing the indicated functions could be employed. For example, ridge density determining circuit 86 (FIG. 2) could be dispensed with and line 84 applied directly to a computer where a decision on regional frequency distribution is made on the basis of neglecting isolated low-ridge counts in high frequency regions and neglecting isolated high-ridge counts in low frequency regions.

While the invention has been particularly shown and described with reference to a preferred embodiment thereof, it will be understood by those skilled in the art that the foregoing and other changes in form and details may be made herein without departing from the spirit and scope of the invention.

What is claimed is:

1. In apparatus for fingerprint recognition wherein the fingerprint pattern comprises ridge lines of a given generally uniform width and ridge line spacings of a given generally uniform width, except at points of transition such as to line bifurcations;

means for performing successive narrow line scans of contiguous segments of a fingerprint;

means for detecting during a scan of said fingerprint the condition that the spacing between two adjacent ridge lines is substantially less than said generally uniform ridge line spacing width, and for providing a first output indicative of the detection of said condition;

means for detecting during a scan of said fingerprint the other condition that the width of a ridge line segment is substantially greater than said generally uniform ridge line width and for providing a second output indicative of the detection of said other condition; and means responsive to detection of one of said outputs in one of said scans and the other of said outputs at a corresponding position in a successive one of said scans to indicate transition to a bifurcation.

2. The apparatus of claim 1 including means for detecting the ridge line density in said scans, and responsive to last said means to inhibit an indication of detection of a bifurcation after a scan detecting a ridge density below a given level.

3. In apparatus for fingerprint recognition wherein the fingerprint pattern comprises ridge lines of a given generally uniform width and ridge line spacings of a given generally uniform width, except at points of transition such as to line endings;

means for performing successive narrow line scans of contiguous segments of a fingerprint;

means for detecting during a scan of said fingerprint the condition that the width of a ridge line segment is substantially less than said generally uniform ridge line width, and for providing a first output indicative of the detection of said condition;

means for detecting during a scan of said fingerprint the other condition that the width of a ridge line spacing is substantially greater than said generally uniform ridge line spacing width and for providing a second output indicative of the detection of said other condition; and means responsive to detection of one of said outputs in one of said scans and the other of said outputs at a corresponding position in a successive one of said scans to indicate transition to a line ending.

4. The apparatus of claim 3 including means for detecting the ridge line density in said scans and means for inhibiting an indication of detection of a line ending after a scan having a ridge density below a given level.

5. In apparatus for fingerprint recognition wherein the fingerprint pattern comprises ridge lines of a given generally uniform width and ridge line spacings of a given generally uniform width, except at points of transition such as to line endings;

means for performing successive narrow line scans of contiguous segments of a fingerprint;

means for detecting during a scan of said fingerprint the condition that the width of a said ridge line segment is substantially less than said generally uniform ridge line width, and for providing a first output indicative of the detection of said condition;

means for detecting during a scan of said fingerprint the other condition that a ridge line spacing width is approximately twice said generally uniform ridge line spacing width and for providing a second output indicative of the detection of said other condition;

means responsive to detection of said second output in one of said scans and said first output in an adjacent scan at a position corresponding substantially to the center of said twice width spacing to indicate transition to a line ending.

6. The apparatus of claim 5 including:

means for detecting the ridge line density in said scans, and responsive to last said means to inhibit an indication of detection of a line ending after a scan detecting a ridge density below a given level.

7. In apparatus for fingerprint recognition wherein the fingerprint pattern comprises ridge lines of a given generally uniform width and ridge line spacings of a given generally uniform width, except at points of transition such as to line bifurcations;

means for performing successive narrow line scans of contiguous segments of a fingerprint;

means for detecting during a scan of said fingerprint the condition that the spacing between two adjacent ridges is substantially less than said general uniform ridge line spacing width and for providing a first output indicative of the detection of said condition;

means for detecting during a scan of said fingerprint the second condition that a ridge line width is approximately twice said generally uniform ridge line width, and for providing a second output indicative of the detection of said second condition;

means responsive to detection of said first output in one said scan and said second output in an adjacent scan at a position corresponding substantially to the center of said twice width spacing, to indicate transition to a line bifurcation.

8. The apparatus of claim 7 including means for detecting the ridge line density in said scans and means for inhibiting an indication of detection of a line bifurcation after a scan having a ridge density below a given level.

9. A pattern recognition device comprises:

a ramp signal generator having an output connected to the input of a pulse squaring circuit and a scanner;

said scanner having an output connected to the input of a video detector;

said video detector having an output connected to the input of a video amplifier, said video having an output connected to the input of a differentiator, said differentiator having an output connected to the input of a pulse squarer, said pulse squarer having an output connected to the input and of an AND gate; said pulse squaring circuit having an output connected to another input of said AND gate;

said AND gate having an output connected to a line connected to the inputs of a ridge density detection circuit, a bifurcation maybe circuit, an inverting circuit, and a one cycle delay circuit;

said ridge density detection circuit having an output connected to the inputs of second, third, fourth and fifth AND gates;

said bifurcation maybe circuit having an output connected to another input of said second AND gate;

said inverter having an output connected to the input of a bifurcation maybe circuit having its output connected to the input of a third AND gate and said inverter having its output connected to the input of a double width detection circuit, said double width detection circuit having an output connected to an input of said fifth AND gate;

said one cycle delay circuit having an output connected to the inputs of a second inverter, a second double width detection circuit, a second bifurcation maybe circuit and a third inverter, said second inverter having an output connected to the input of a double width detection circuit having an output connected to an input of said third AND gate, said second double width detection circuit having an output connected to an input of said second AND gate, said second bifurcation maybe circuit having an output connected to the input of said fourth AND gate, said third inverter having an output connected to the input of a bifurcation maybe circuit having an output connected to an input of said fifth AND gate;

said first double width detection circuit having an output connected to an input of said fourth AND gate.

10. Apparatus in accordance with claim 9 wherein a bifurcation maybe circuit comprises the terminal connected to an integrator having an output connected to a level detector having an output connected to the input of a trigger said terminal being connected to another input of said trigger, said trigger having an output connected to a second integrator having an output connected to a second level detector having an output connected to the input of a pulse generator having an output connected to the input of a delay circuit having an output connected to the output terminal of said bifurcation maybe circuit.

11. Apparatus in accordance with claim 9 wherein said double width detection circuits comprise an input terminal having a connection to the input of an integrator circuit and an input to a differentiator and inverter circuit;

said integrator circuit having an output connected to the inputs of a first and second single shot circuits, said first and second single shot circiuts having oppositely disposed terminals thereof connected to inputs of an AND gate; said differentiator and inverter circuit having an output connected to a third input of said AND gate; said AND gate having an output connected to the input of a single shot; said single shot having its output which is normally off connected to the output terminal of said double width detection circuit.

References Cited

UNITED STATES PATENTS 3,268,864 8/1966 Kubo ............ 340—146.3

MAYNARD R. WILBUR, Primary Examiner

R. F. GNUSE, Assistant Examiner

U.S. Cl. X.R.

340—149